United States Patent [19]

Hirano

[11] Patent Number: 4,546,545
[45] Date of Patent: Oct. 15, 1985

[54] PINEAPPLE CUTTER

[76] Inventor: Tsugutoshi Hirano, Kita-Koiwa 3-chome 26-10, Tokyo, Japan

[21] Appl. No.: 556,547

[22] Filed: Nov. 30, 1983

[30] Foreign Application Priority Data

Jan. 21, 1983 [JP] Japan ............................ 58-005946[U]

[51] Int. Cl.[4] .......................... B26B 3/00; A47J 25/00
[52] U.S. Cl. ........................................ 30/128; 30/130; 30/301; 30/302; 99/543; 99/545
[58] Field of Search ............... 30/302, 301, 316, 128, 30/130; 99/542, 543, 544, 545

[56] References Cited

U.S. PATENT DOCUMENTS

| 867,970 | 10/1907 | Hedborg et al. | 30/130 X |
|---|---|---|---|
| 968,940 | 8/1910 | Harrison | 30/130 X |
| 1,466,114 | 8/1923 | Buchi . | |
| 1,531,179 | 3/1925 | Daly | 30/130 X |
| 1,744,422 | 1/1930 | Taylor . | |
| 2,370,650 | 3/1945 | Fitzsimmons | 30/301 |
| 2,402,558 | 6/1946 | Benge | 30/302 |
| 3,232,246 | 2/1966 | Nishkian | 30/316 |
| 3,540,503 | 11/1970 | McNair . | |
| 3,667,519 | 6/1972 | Shadduck | 30/301 X |
| 3,810,308 | 5/1974 | Stubbmann | 30/302 X |
| 3,874,280 | 4/1975 | Vadas | 99/544 X |
| 4,246,700 | 1/1981 | Coulon et al. . | |
| 4,490,912 | 1/1985 | Hirano | 30/301 X |

FOREIGN PATENT DOCUMENTS 509487 10/1937 United Kingdom ................ 30/130
764717 1/1957 United Kingdom .

Primary Examiner—E. R. Kazenske
Assistant Examiner—Willmon Fridie, Jr.
Attorney, Agent, or Firm—Fleit, Jacobson, Cohn & Price

[57] ABSTRACT

A pineapple cutter is provided with a cylindrical body 1 having a cutter edge 1a at the circumference end portion of the lower end, a pair of handles 5, 5 connected to the outer surface of said cylindrical body, a pressing sheet mounted on the inner portion of said cylindrical body 3 slidably in the vertical direction, and a pushing member secured to the upper portion of the cylindrical body connected with the pressing sheet.

A pineapple is cut by being inserted into said cylindrical body 1.

7 Claims, 5 Drawing Figures

PINEAPPLE CUTTER

BACKGROUND OF THE INVENTION

This invention relates to a pineapple cutter which punches the peel of a pineapple and its interior so as to separate easily after cutting upper and lower end portions of said pineapple respectively.

Heretofore, as a pineapple cutter, a large shape of cutter for business use which is used in a processing work, a selling shop and the like, has been chiefly manufactured and such one is heavy in weight and inconvenient in treatment for the use of a general household.

SUMMARY OF THE INVENTION

This invention is performed, in view of said conditions described above to provide a handy type pineapple cutter which can be used easily even in a general household. Particularly, it is to provide a pineapple cutter which enables to take out easily the interior after cutting.

In other words, the pineapple cutter according to this invention consists of a cylindrical body having cutter edges at the lower circumference end portion thereof, a pair of handles continuously connected to the outer surface of said cylindrical body, a pressing sheet secured to the inner portions of said cylinder slidably toward an upper and lower direction, and a pressing member attached to the upper portion of the cylinder being connected with said pressed sheet.

DETAILED DESCRIPTION OF THE INVENTION

The preferred embodiment of the present invention will be hereinafter described with reference to the accompanying drawings.

Figure 1:
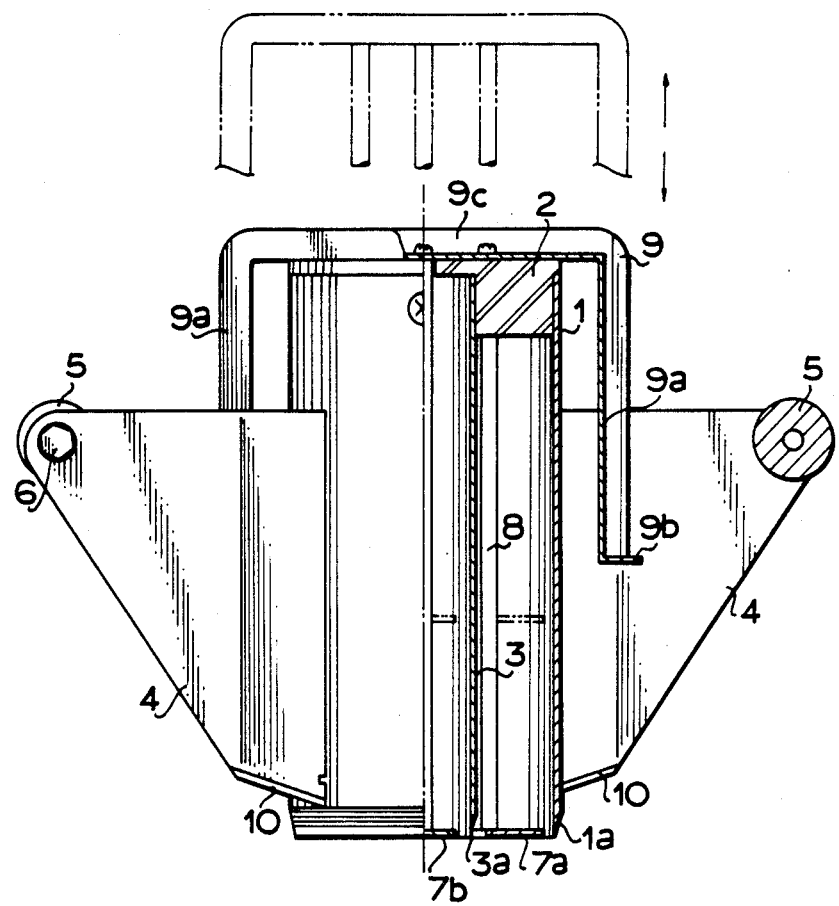
FIG. 1 is a partially sectional view which shows an embodiment of this invention.
Figure 2:
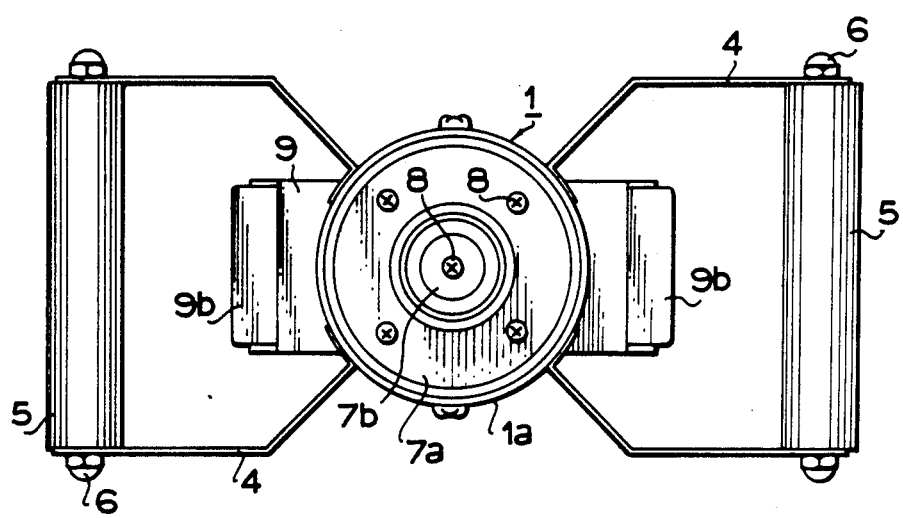
FIG. 2 is a plan view thereof.

As shown in FIG. 1 and FIG. 2, a cylinder 1 arranged at the central portion is a cylindrical body into which the interior of a pineapple is inserted at the time of cutting, the upper end portion of said cylindrical body being supported with an orbicular lid 2 and the edge circumference of the lower end portion thereof being provided with a cutter edge 1a. A diameter and a length of said cylindrical body 1 are designed to a standard diameter and a standard length fit for a pineapple having a standard size respectively. However, said diameter and said length may be changed properly without being defined thereto. At the central portion of said cylinder 1, a small cylinder 3 having a small diameter by which the core of pineapple is taken out, is secured being supported by said lid 2. Around the edge portion of the lower end, there is provided with edge 3a for taking out the core, whereby the core, an uneatable portion of the pineapple, is separated from its interior portion at the same time of pineapple cutting.

On the outer surface of said cylindrical body 1, a pair of supporting sheets (4, 4) having an approximately U-type in plane are secured, and each upper portion of said supporting sheets (4, 4) are secured and on the upper portion of each supporting sheet 4, a pair of handles (5, 5) are transversely secured with bolts (6, 6) respectively. Therefore, when handles (5, 5) are pressed downward with hands respectively, said cutter edge 1a and a core removing edge 3a encroach into the pineapple to cut it.

Further, at the inner portion of said cylindrical body 1, a pressing sheet is slidably carried in the inner cylinder wall in the vertical direction. In the illustrated example, said pressing sheet comprises an annular pressing sheet 7a having a large diameter like a circular doughnut and a pressing sheet 7b having a small diameter secured inside the core removing cylinder 3. Connecting rods 8,8 . . . are mounted on the upper surface of each of pressing sheets 7a and 7b, on the upper portion of said connecting rods 8,8 . . . , a pressing member 9 being connected thereon. The pressing member 9 consists of a bended sheet body like a U-type at the side thereof, bended pieces, 9a and 9a, from the ceiling portion 9c of said pressing member 9 being positioned at the outside of said cylindrical body 1. Pressing pieces, 9b and 9b, are formed by bending the lower edges of the bending pieces, 9a and 9a, toward the outside directions of the cylindrical body 1 respectively. After the cut of the pineapple, said pressing sheets, 7a and 7b, are allowed to slide downward by pressing the pressing pieces, 9b and 9b, or the ceiling portion 9c by way of the connecting rods 8,8 . . . , thereby being able to take out the interior part and the core of the pineapple inserted into the cylindrical body 1 or the core removing cylinder 3 from the lower portion thereof.

In FIG. 1, the numerals, 10, 10 . . . , are peeling edges mounted on the lower surface of said supporting sheets, 4, 4 . . . , respectively, thereby being able to cut the pineapple peel into 4 parts.

Figure 3:
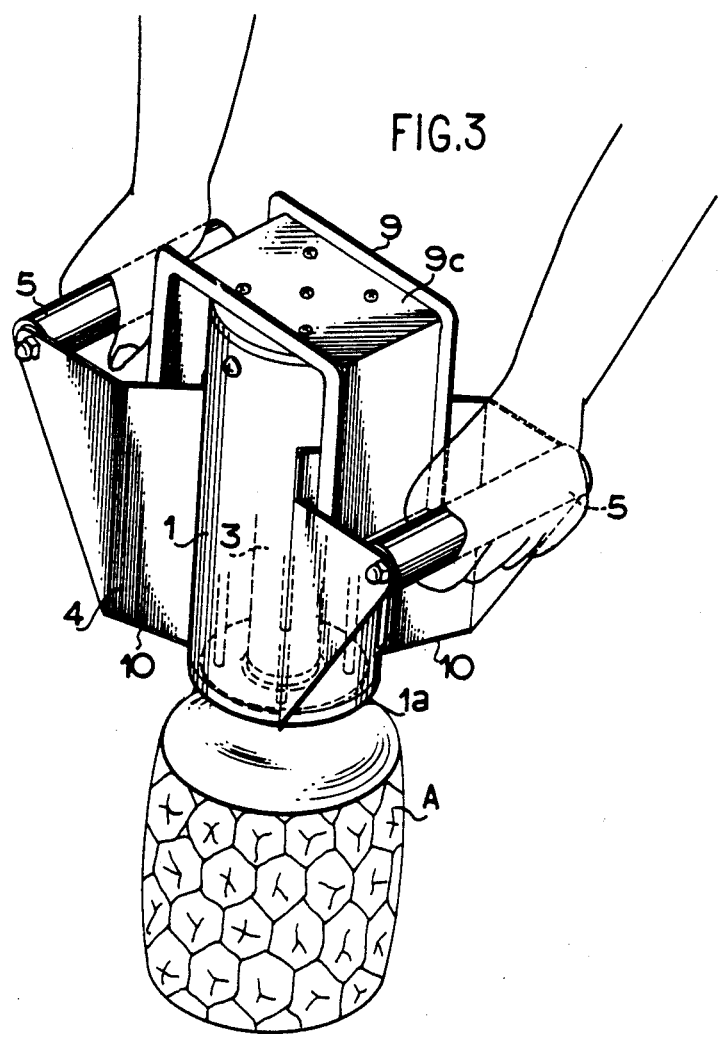
FIG. 3 to FIG. 5 are perspective views which represent the order of the treatment.
Figure 4:
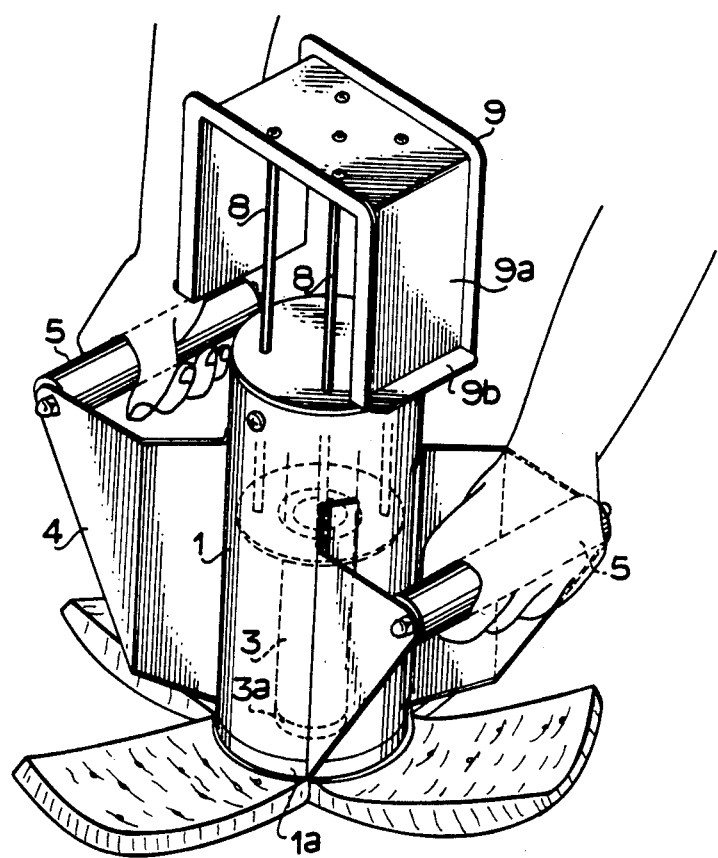
Figure 5:
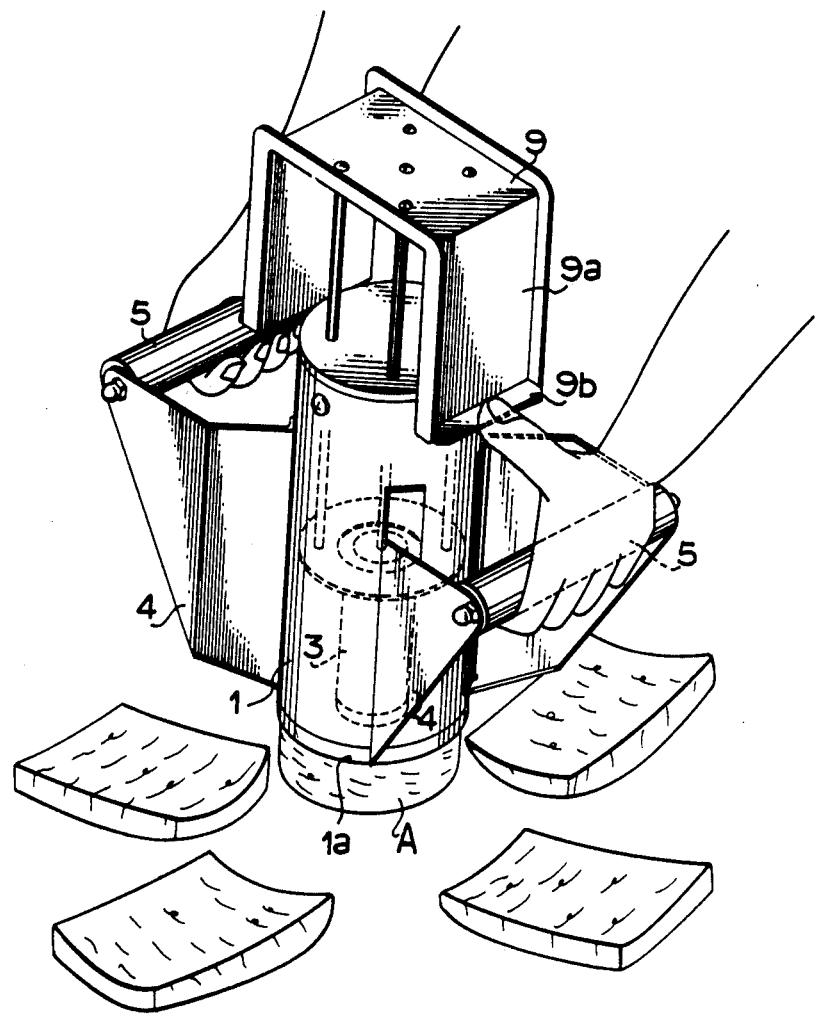

In order to cut the pineapple according to the example described above, after cutting down the upper and the lower ends of the pineapple in transverse directions with a knife previously, the cylindrical body 1 is adapted to press into the pineapple from the upper surface of the pineapple A grasping said handles, 5 and 5, with both hands as shown in FIG. 3, whereby together with separation and falling off of the exterior of the pineapple due to the cutting of the peel into 4 parts, the interior to be eatable is inserted into the cylindrical body 1. Further, when the interior is inserted therein, said pressing sheets, 7a and 7b carried in the inside the cylindrical body 1 slides towards the upper direction and the pushing member 9, connected with the upper portions of the pressing sheets, 7a and 7b, also slides towards the upper direction and moves within cylindrical body 1 to an upper portion thereof. Accordingly, when the pressing pieces, 9b and 9b, of the pushing member 9 is pressed toward the lower direction with fingers grasping the handles, 5 and 5, with hands as shown in FIG. 5, in this state, the pressing sheets, 7a and 7b, slide toward the lower direction, and the interior is separated from the core, thereby being able to remove the core. After that, it is possible to eat the interior if only said doughnut-like interior is sliced at an appropriate thickness.

Accordingly, according to this invention, the pineapple cutting is possible with very simple operation and ease. In addition, since the construction is simple, light and small in size, it is possible to use it not only in the houshold, but also working factories and selling shops, and is widely usable for various porposes. Furthermore, for taking out the interior after the cut, it is only to slide the pressing sheet toward the lower direction. Therefore, it is very simple and hygienic.

Although, the pushing member in the above example is formed to be a U-type at the side thereof, it is not defined to this shape and may be a disk or a rectangular shape. Further, it may be not provided with the pressing sheets. Also, the core removing cylinder inside the cylindrical body may be removed when the presence of the core is no problem in the pineapple working. In this case, the pineapple is cut in a cylindrical shape and both the core removing edges and the pressing sheets having small diameter can be removed, whereby the construction becomes simple. Further, the cylindrical body may be a hexagon or an octagon column or the like to change the shape of the pineapple. In this invention, the peel removing edges which divides the peel into 4 sections may be remove because the removal of the interior, in this invention, is very easy. In this case, the pineapple cutting is easy and the removal of the interior of the pineapple is also easy.

As described above in details, it is possible to provide a pineapple cutter which is simple in construction, easy in cutting operation and possible to remove the interior of the pineapple.

What I claim is:

1. A pineapple cutter comprising:
    a tubular outer body having a cutter edge around the end portion of a lower end of said tubular outer body;
    a tubular inner body positioned within and having its axis substantially parallel to the axis of said tubular outer body, said inner body having a cutter edge around the end portion of a lower end of said inner body;
    a pair of handles spaced outwardly from the outer surface of said tubular outer body, each handle carried by a pair of spaced supporting plates secured to and extending outwardly of said tubular outer body and having cutting edges at the lower end portions thereof to cut the outer peel of the pineapple into separate sections;
    a plurality of pressing sheets slidably carried in the inner portion of said tubular outer body and slidable in the axial direction, said pressing sheets including a first, annular pressing sheet slidably carried between said tubular outer body and said inner body, and a second pressing sheet slidably carried within said inner body; and
    a pressing member extending outwardly of the upper portion of said tubular outer body and movable axially relative thereto, said pressing member including connection means for connecting said pressing member with the pressing sheets; and thereby obtaining a substantially annular cut pineapple by pressing down said cutter onto a pineapple and then pressing down on the pressing member to move the pressing sheets of said pressing member downwardly toward the cutter edges of the tubular outer body so that the interior of the pineapple may be separated from its core.

2. A pineapple cutter according to claim 1 wherein said pressing member includes a top wall and said connection means includes a plurality of connecting rods that extend from and interconnect said pressing sheets and said top wall.

3. A pineapple cutter according to claim 2 wherein said top wall is of rectangular shape.

4. A pineapple cutter according to claim 3 wherein said pressing member is of generally U-shape when viewed from the side and includes a pair of legs that depend from said top wall.

5. A pineapple cutter according to claim 4 wherein said pressing member includes pressing pieces extending laterally outwardly from said legs and spaced from said top wall.

6. A pineapple cutter according to claim 1 wherein said tubular outer body and said tubular inner body each have a circular cross section.

7. A pineapple cutter according to claim 6 wherein said tubular outer body and said tubular inner body are positioned substantially coaxially.

* * * * *